United States Patent [19]
Luffy et al.

[11] Patent Number: 5,435,127
[45] Date of Patent: Jul. 25, 1995

[54] METHOD AND APPARATUS FOR BOOSTING RAM AIRFLOW TO AN EJECTION NOZZLE

[75] Inventors: Ronald J. Luffy, Maineville; John B. Taylor, Jr., Cincinnati; William V. Sutherland, Milford; Frederick J. Stine, Mainville, all of Ohio; Crowley James A. Crowley, Midlothian, Va.; David E. Mann, West Chester, Ohio; William Steyer, Topsfield, Mass.

[73] Assignee: General Electric Company, Cincinnati, Ohio

[21] Appl. No.: 151,669

[22] Filed: Nov. 15, 1993

[51] Int. Cl.⁶ ............................................. F02K 1/36
[52] U.S. Cl. ............................. 60/204; 60/262; 60/266
[58] Field of Search .............. 60/226.1, 226.3, 262, 60/266, 269, 39.07, 204

[56] References Cited

U.S. PATENT DOCUMENTS

| | | | |
|---|---|---|---|
| 3,409,228 | 11/1968 | Mehr | 239/127.3 |
| 3,432,100 | 3/1969 | Hardy et al. | 239/127.3 |
| 3,463,402 | 8/1969 | Langston, Jr. | 239/265.13 |
| 3,467,312 | 9/1969 | Mehr | 239/127.3 |
| 3,979,065 | 9/1976 | Madden | 239/127.3 |
| 4,081,137 | 3/1973 | Sutton et al. | 239/127.3 |
| 4,098,076 | 7/1978 | Young et al. | 60/230 |
| 4,203,286 | 5/1980 | Warburton | 60/266 |
| 4,351,150 | 9/1982 | Schulze | 60/266 |
| 4,502,638 | 3/1985 | Szuminski et al. | 239/265.29 |
| 4,544,098 | 10/1985 | Warburton | 239/127.3 |
| 5,155,993 | 10/1992 | Baughman et al. | 60/226.1 |
| 5,216,878 | 6/1993 | Klees | 60/204 |
| 5,255,849 | 10/1993 | Mayer et al. | 60/266 |

OTHER PUBLICATIONS

Patent Application S/N 07/787,869, filed Nov. 5, 1991 (our 13LN-1944) Mayer, et al., "Cooling Air Transfer Apparatus for Aircraft Gas Turbine Engine Exhaust".

*Primary Examiner*—Richard A. Bertsch
*Assistant Examiner*—William J. Wicker
*Attorney, Agent, or Firm*—David L. Narciso; Andrew C. Hess

[57] ABSTRACT

An ejecting exhaust nozzle in a gas turbine engine includes a convergent section, a divergent section, extending downstream from the convergent section, and an ejector for ejecting an airflow into the core airflow is fed by a boost pump. The boost pump includes a flow mixer with a boost plane wherein a fan airflow is injected into a ram airflow and then mixed in a mixing section extending downstream from the boost plane. Varying the fan airflow to boost the ram airflow to control a boosted ram airflow pressure allows ejector operation throughout the flight envelope of the gas turbine engine.

20 Claims, 5 Drawing Sheets

METHOD AND APPARATUS FOR BOOSTING RAM AIRFLOW TO AN EJECTION NOZZLE

The U.S. Government has rights in this invention pursuant to Contract No. F33657-83-C-0281 awarded by the Department of the Air Force.

TECHNICAL FIELD

This invention relates generally to an aircraft gas turbine engine and more particularly to a converging-/diverging exhaust nozzle with an ejector in the divergent section.

BACKGROUND OF THE INVENTION

A typical aircraft gas turbine engine includes, in serial flow relationship, an engine inlet, a fan, a core engine, including a compressor, combustor, and high and low pressure turbines, defining a core flowpath for core airflow, and an exhaust nozzle for accelerating the core airflow to obtain maximum thrust. In a turbofan type gas turbine engine a portion of fan air bypasses the core and rejoins the core airflow aft of the turbines and forward of the exhaust nozzle. In a turbojet engine there is no fan or bypass. An exhaust nozzle for an engine designed for supersonic operation typically includes a convergent section for accelerating the core airflow to choked flow (Mach 1) at the nozzle throat, and a divergent section for accelerating the airflow supersonically. An ejector can be provided in the divergent section whereby the higher velocity/higher pressure core gas stream is used to withdraw lower velocity/lower pressure gas stream, conventionally from a source of ram or ambient air. Such ejecting exhaust nozzles have been developed for both cooling and sound suppression purposes. U.S. Pat. No. 3,463,402, Jet Sound Suppressing Means, to Charles E. Langston, Jr., teaches use of an ejecting exhaust nozzle to generate turbulence between two streams of gas, thus suppressing the noise normally generated from shear stresses at the interface of the higher velocity core gas stream with the lower velocity gas stream. U.S. Pat. No. 3,409,228, Ejector Nozzle, to Hans P. Mehr, teaches an ejector nozzle for cooling a gas turbine engine and exhaust nozzle, whereby an ejector is in flow communication with an engine inlet and draws the ram airflow through a bypass duct to provide cooling to the engine and exhaust nozzle, additionally providing a ram air inlet proximate the exhaust nozzle for low Mach number operation wherein the pressure drop through the bypass duct inhibits the desired ejector flow.

It has been found that proper ejector operation for withdrawing the lower pressure air through an ejector into the higher velocity/higher pressure gas stream is dependent on, for a given ejector configuration, the pressure ratio defined by the pressure of the ejected air supply divided by the core airflow pressure. FIG. 1 is a representative flight map of Mach number versus altitude for an aircraft with an augmented gas turbine engine. Contour lines are provided representing the pressure ratio defined by the available supply ram air pressure, $P_{RAM}$, divided by the core airflow total pressure at the nozzle throat, $P_8$, for the representative engine at maximum power. The nozzle throat is conventionally referred to as station 8, thus the corresponding pressure $P_8$ is a conventional parameter used by those skilled in the art of exhaust nozzle design and performance. The nozzle throat is also a conventional location for an ejector, as the core airflow static pressure drops and velocity increases beginning at the throat when the flow is choked there. For a given ejector nozzle configuration, including size and location between the nozzle throat and nozzle exit, to operate from ram pressure only, the pressure ratio $P_{RAM}/P_8$ must be above a critical ejector pressure ratio, determined by conventional methods, for that particular ejector configuration. If, for example, the critical ejector pressure ratio is determined to be 0.22, the ejector would not operate unless the aircraft was operating to the right of contour line 0.22, at a relatively high Mach number for a given altitude. If the pressure ratio is below the critical ejector pressure ratio for the configuration, flow through the ejector will be inhibited, and if too low, the ejector will be subject to flow in the reverse direction, i.e., from the core flow to the ejector air source. At low Mach numbers, the ram air pressure is low because the velocity component of the total ram pressure is negligible, and could be below the critical value. If this occurs, the ejector will not operate to pump air into the core stream for either cooling or sound suppression. In modern military gas turbine engines which have a high engine pressure ratio ($P_8/P_{RAM}$), it is difficult to provide cooling air to the divergent exhaust nozzle, especially at low Mach numbers. In engines including a thrust augmentor, it is particularly critical to provide cooling airflow to the exhaust nozzle whenever the augmentor is on, including at low Mach numbers. Higher pressure fan air is therefore often used for nozzle cooling, as cooling from a ram air ejector alone could be inadequate. However, use of such fan air is quite expensive in terms of engine performance and efficiency.

SUMMARY OF THE INVENTION

It is therefore an object of the present invention to provide an ejecting exhaust nozzle operable through all operating conditions of a modern aircraft gas turbine engine. It is another object to provide an ejecting exhaust nozzle wherein use of fan air is minimized. It is a further object to provide an ejecting exhaust nozzle wherein the pressure ratio of the ejected air supply to the core airflow for a given operating condition is variable and controllable.

Stated briefly, the present invention accomplishes the foregoing objects by incorporating in an ejecting exhaust nozzle a boost pump for controllably injecting fan or compressor air into a ram airflow to boost the pressure of the ram airflow and supplying the boosted ram air to a divergent section ejector.

In a preferred embodiment, the present invention includes an ejecting exhaust nozzle including a convergent section, a divergent section, and an ejector supplied by a boost pump. The boost pump includes a flow mixer wherein a source of fan air is controllably injected into a source of ram air at a boost plane and mixed to achieve a boosted ram airflow by the higher pressure/higher velocity fan airflow entraining the lower pressure/lower velocity ram airflow over a mixing section. The boost pump controls the pressure level of the boosted ram airflow by means including controlling the ratio of the fan airflow to the ram airflow and diffusing the boosted ram airflow to achieve a higher static pressure such that the ejector nozzle is operable throughout the operating environment of the gas turbine engine. In an alternate embodiment, the boost pump uses multiple flow mixers in parallel, with valves to control the fan airflow through each individual flow mixer, and backflow valves to prevent backflow through a flow mixer wherein the valve is closed. Another alternate embodiment controls the ratio of fan airflow to ram airflow by mechanically changing the ratio of ram flow area to fan flow area. In a turbojet engine, the higher pressure airflow can be supplied to the boost pump from a compressor.

A major advantage of the present invention is that by boosting the pressure of the ram air source, an ejecting exhaust nozzle is operable through all operating environments of the engine with a minimum use of fan air supply. These and other features of the present invention will become apparent to those skilled in the art from the detailed description of the preferred embodiment when taken in conjunction with the accompanying drawings.

BRIEF DESCRIPTION OF THE DRAWINGS

In the course of the following detailed description, reference will be made to the accompanying drawings in which.

DETAILED DESCRIPTION OF THE PREFERRED EMBODIMENT

Like references have been used to designate like or corresponding parts throughout the several views.

Figure 2:
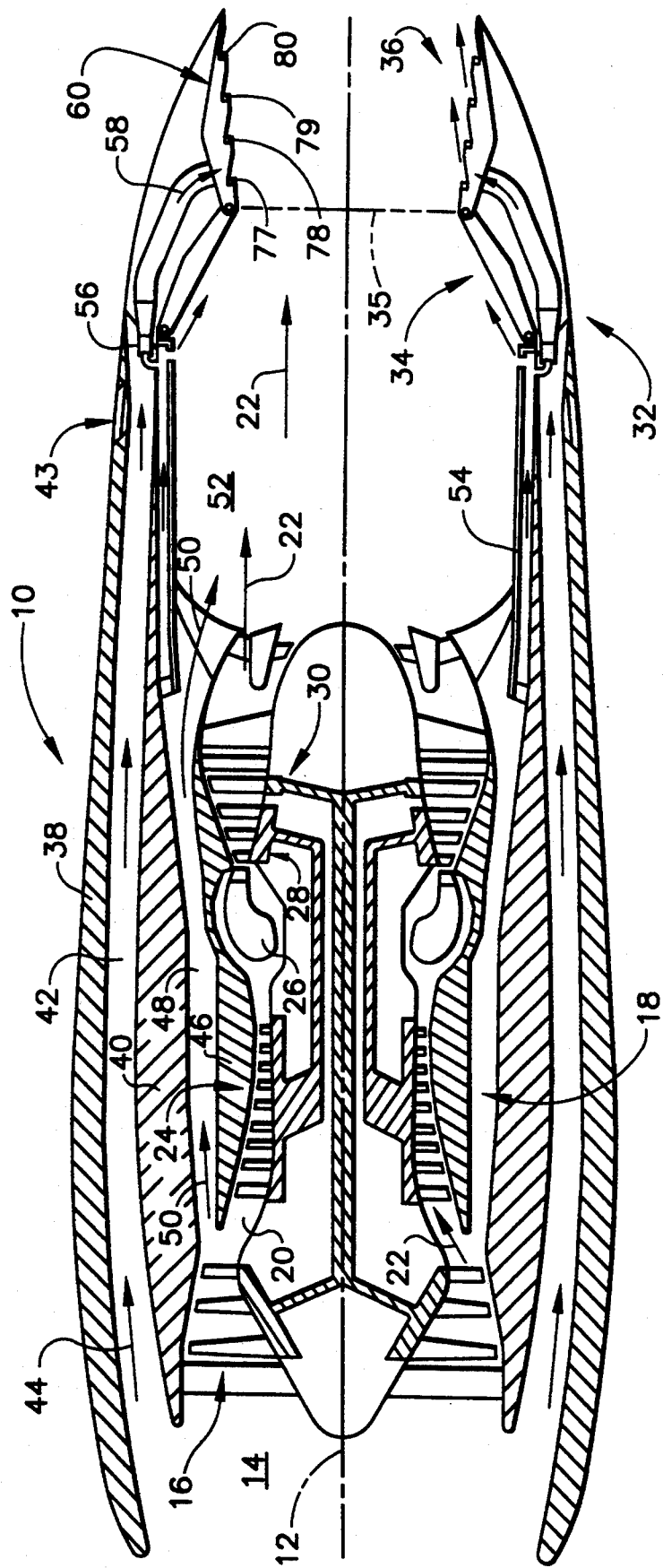
FIG. 2 is a schematic representation of a gas turbine engine including a converging/diverging ejecting exhaust nozzle.

Referring now to FIG. 2, a gas turbine engine 10 is shown schematically having a longitudinal centerline 12. The engine includes an engine inlet 14 and, in serial flow relationship, a fan 16, a core engine 18, defining a core flowpath 20 for core airflow 22, including a compressor 24, combustor 26, and high and low pressure turbines 28 and 30 respectively, which supply the core airflow 22 to an ejecting, variable area exhaust nozzle 32 having a convergent section 34, a throat 35, and a divergent section 36, with actuation mechanisms, not shown, for controlling the throat and nozzle exit areas. The engine includes an outer casing 38 spaced from a mid-casing 40, defining therebetween a ram air bypass duct 42 for supplying a ram airflow 44 around the core engine 18 into the ejecting exhaust nozzle 32. The engine also includes an inner casing 46 spaced from the mid-casing 40 defining therebetween a fan airflow bypass duct 48 for supplying a portion of the fan airflow 50 around the remainder of the core engine 18 and rejoining the core airflow 22 in an augmentor 52, with a portion of the fan airflow 50 being directed through an augmentor cooling liner 54 and injected into the exhaust nozzle proximate the convergent section 34 with a portion being bled off into a boost pump 56. During boost pump 56 operation, fan airflow 50 having a fan airflow temperature, velocity, and pressure is controllably injected into ram airflow 44 having a ram airflow temperature, velocity, and pressure in boost pump 56 to entrain the ram airflow and achieve a boosted ram airflow 58 having a boosted ram airflow temperature, velocity, and pressure. This boosted ram airflow is then supplied to ejectors 60 in divergent section 36. Boost pump 56 is supplied with a ram airflow through bypass duct 42 extending to the engine inlet and/or a ram air inlet 43 proximate the engine exhaust nozzle.

Figure 2A:
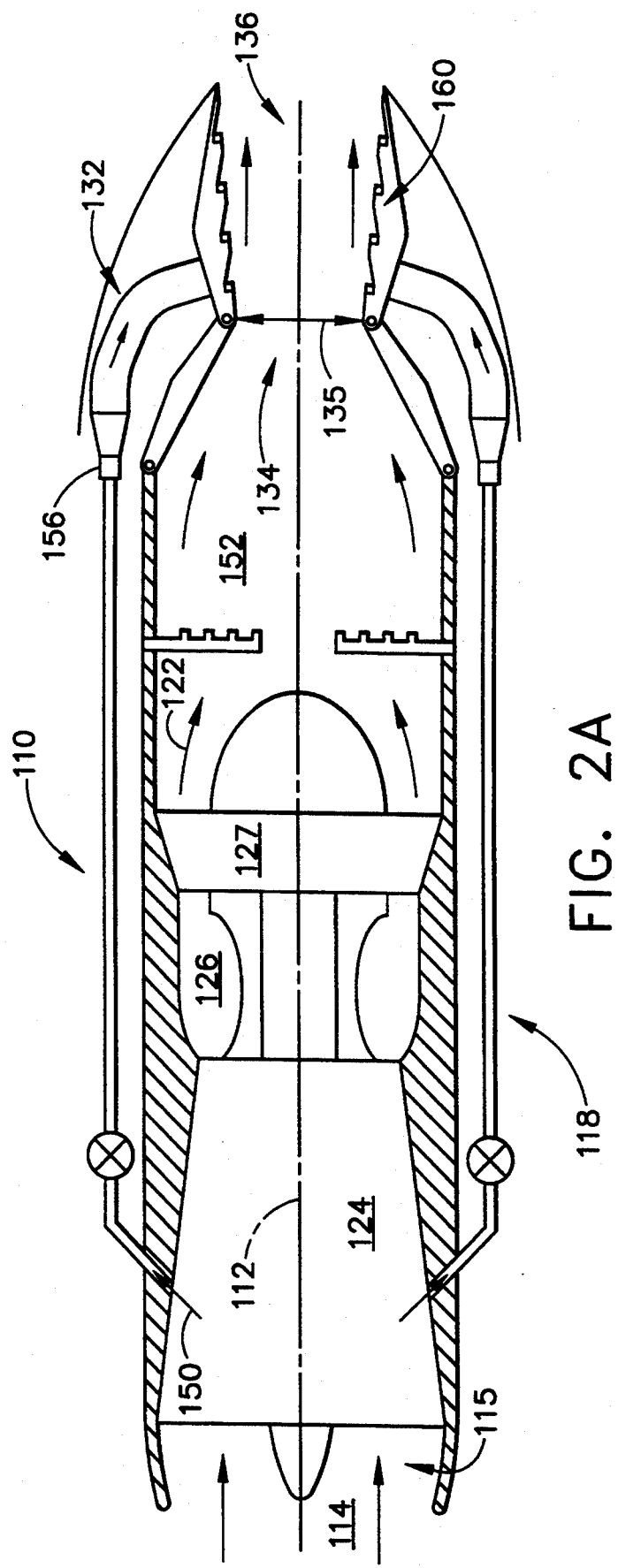
FIG. 2A is a schematic representation of a turbojet gas turbine engine.
Figure 4:
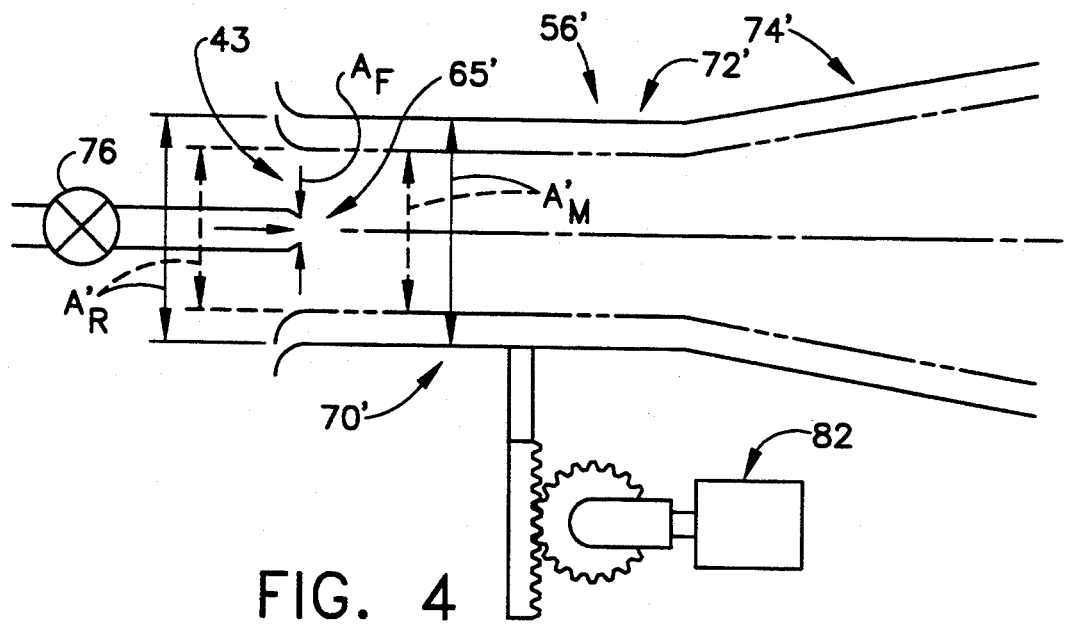
FIG. 4 is a schematic representation of an alternative embodiment of a boost pump of the present invention.
Figure 5:
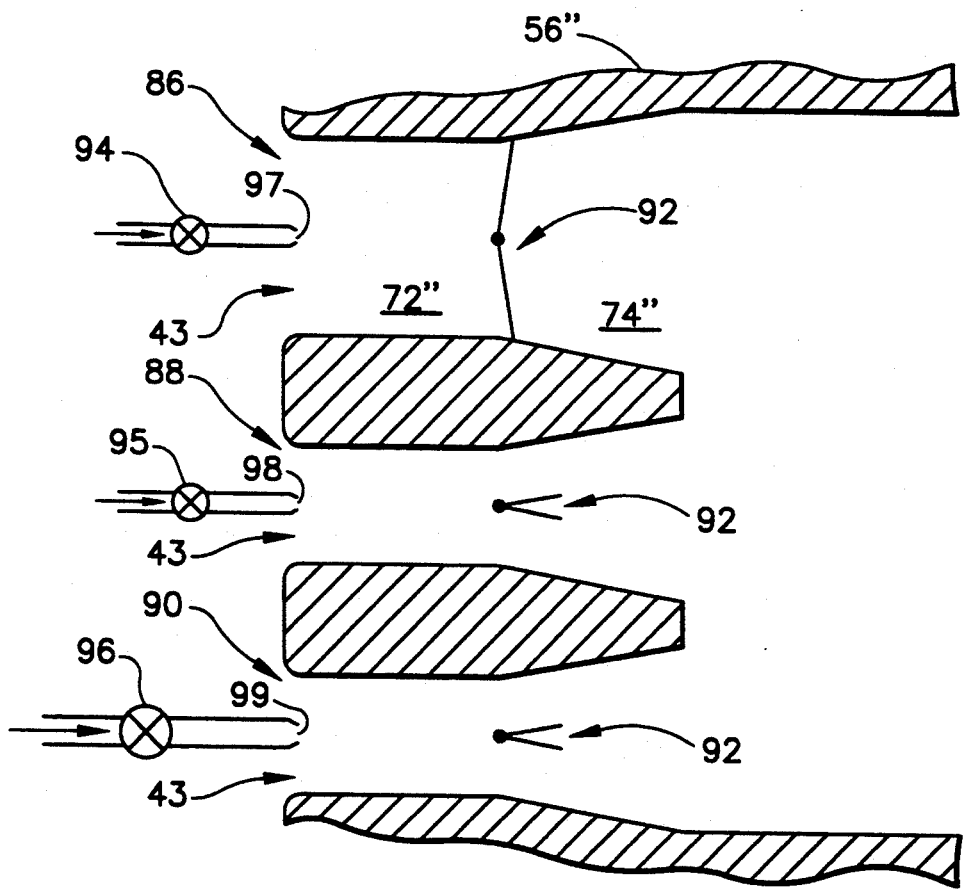
FIG. 5 is a schematic representation of another alternative boost pump of the present invention.

Referring now to FIG. 2A, a gas turbine engine 110 of the turbojet variety, i.e., lacking a fan and fan bypass duct, is shown schematically with centerline 112. Engine 110 includes engine inlet 114 with a diffuser 115, and then in serial flow relationship a core engine 118 including a compressor 124, including multiple stages not shown, a combustor 126, and a turbine 127 defining a core flowpath, not shown, with core airflow 122 then entering augmentor 152 and ejecting variable area exhaust nozzle 132, which includes convergent section 134, throat 135, and divergent section 136. The ejecting exhaust nozzle 132 is provided with a boost pump 156 which, during boost pump operation, receives compressor airflow 150, which can be bled from any stage of the compressor 124, having a compressor airflow temperature, velocity, and pressure (dependent on the compressor stage bled from) controllably injected into a ram airflow to entrain the ram airflow and achieve a boosted ram airflow 158 for supply to ejectors 160. Operation of the boost pump 156 of FIG. 2A is analogous to the operation of boost pump 56 in FIG. 2, the only difference being the source of the higher total pressure air, supplied from a fan in FIG. 2 in a turbofan type gas turbine engine versus being supplied a compressor in the turbojet type engine of FIG. 2A. In either case, the boost pump is being supplied with a first airflow having a total pressure high enough to entrain a ram airflow, from a source not shown in FIG. 2A but analogous to the sources in FIG. 2, such that a boosted ram air pressure for operating an ejector throughout all areas of the flight map is achieved. Thus, particular embodiments of boost pumps as depicted in FIGS. 3 through 5 can be incorporated in the turbojet of FIG. 2A.

Figure 3:
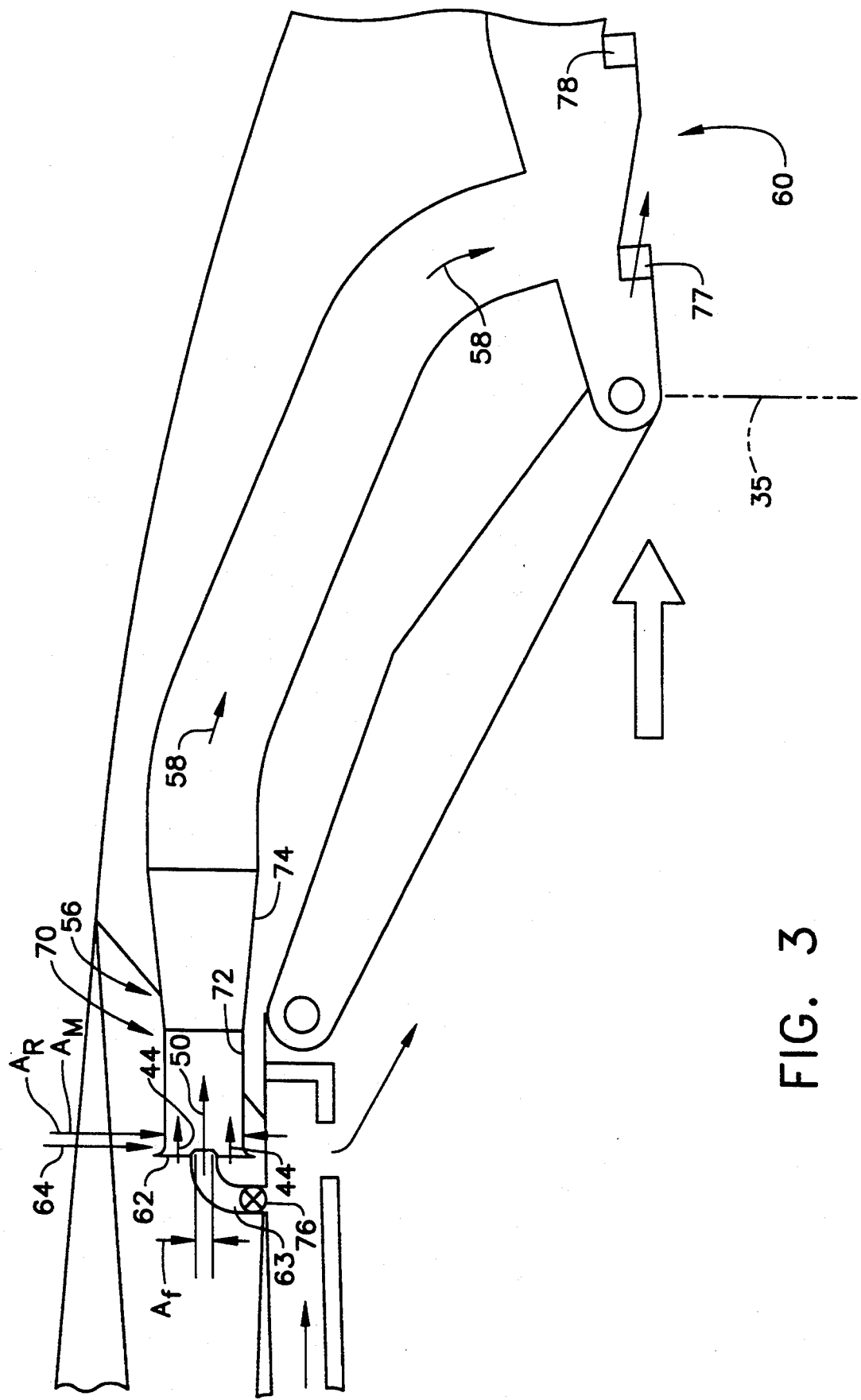
FIG. 3 is an enlarged view of the top portion of the converging/diverging ejecting exhaust nozzle from FIG. 2 including details of one embodiment of a boost pump of the present invention.

Referring now to FIG. 3, an enlarged view of the top portion of the exemplary embodiment of the converging/diverging ejecting exhaust nozzle from FIG. 2 is shown. Boost pump 56 is shown as having a boost pump inlet 62 for receiving ram airflow 44 and fan airflow 50. Fan airflow 50 is shown as being injected through fan airflow injector 63 into ram airflow 44 at a boost plane 64 proximate the boost pump inlet 62. The boost plane 64 is defined by the fan airflow area $A_f$ at the outlet of fan airflow injector 63 and the ram airflow area $A_r$. These areas, $A_f$ and $A_r$, are substantially perpendicular to the substantially parallel fan airflow 50 and ram airflow 44, respectively. The boost pump 64 further includes a flow mixer 70 extending downstream from the boost pump inlet 62 with a mixing section 72 which has a substantially constant cross-sectional area $A_m$, which is substantially the same as the ram airflow area $A_r$, the difference being the fan airflow area $A_f$. A diffuser 74 extends downstream from the mixing section 72 with an increasing cross sectional area. The boost pump 56 further includes a means for controlling the ratio of fan airflow to ram airflow, such as valve 76 controlling the fan airflow through the fan airflow injector 63. During boost pump operation, the fan airflow 50 entrains the ram airflow 44 through the mixing section 72 to achieve a mixed flow that is then diffused to increase pressure in the diffuser 74 to achieve a substantially uniform boosted ram airflow 58.

In nozzle divergent section 36 the core airflow static pressure will drop from a higher value at the throat 35 while the core airflow Mach number increases through supersonic expansion along the length of the divergent section 36, properly expanded, when the flow is choked at the throat 35. The core airflow static pressure and Mach number along the flap are therefore a function of $P_8$ and position along the length of the flap. Therefore, in the representative example of FIGS. 2 and 3 the core airflow static pressure corresponding to individual ejectors 77, 78, 79, and 80 will decrease while the core airflow Mach number increases from 77 through 80 when the core airflow is choked at the nozzle throat 35, thus the ram pressure necessary for ejector operation will be less the further downstream the individual ejector is, ejector 80 requiring less ram pressure than ejector 77, for example. In order to ensure proper ejector operation with multiple streamwise ejectors, a critical ejector pressure ratio is determined by using the ejector location with the highest core airflow static pressure and lowest Mach number, i.e., closest to the throat.

Figure 1:
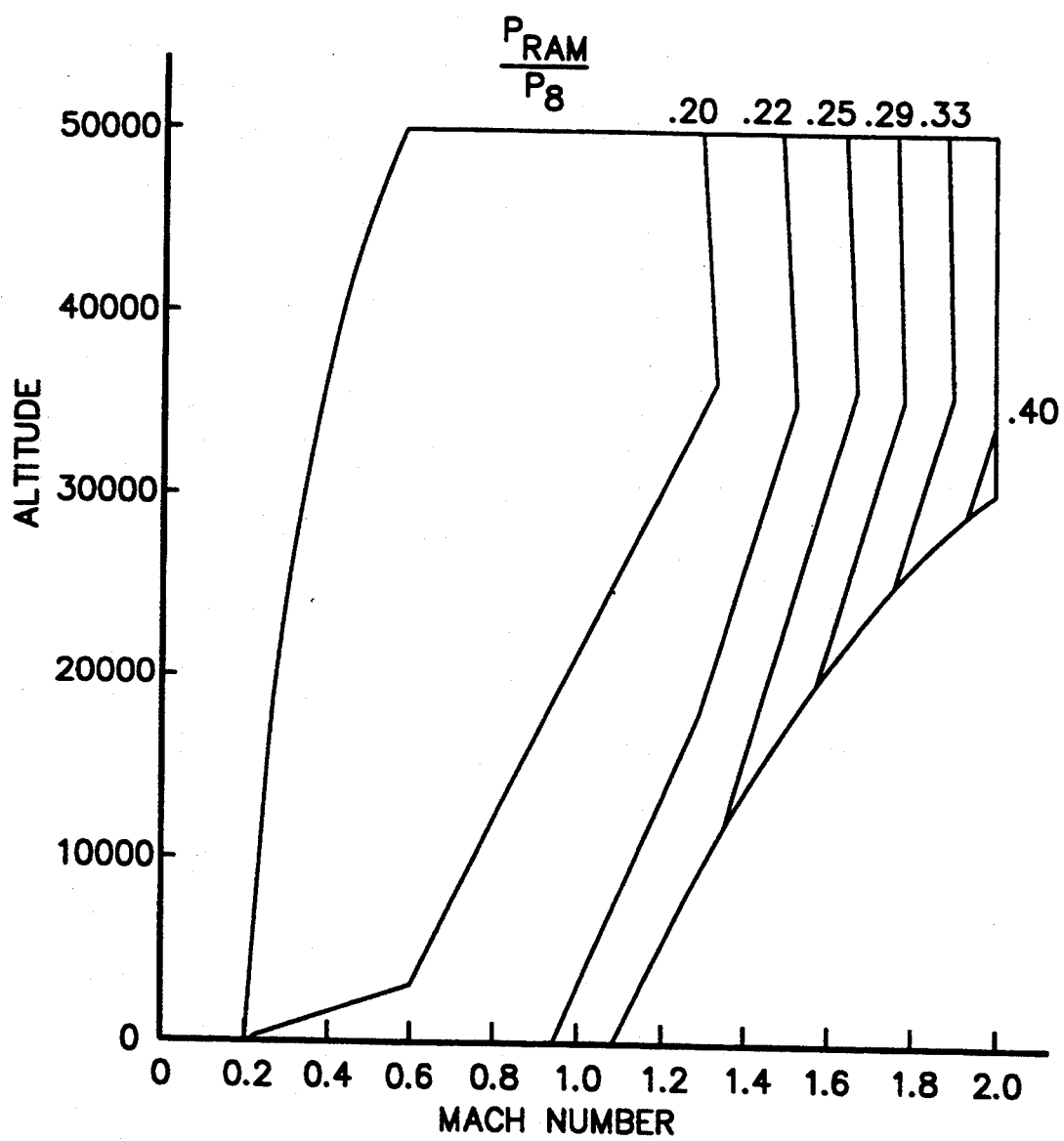
FIG. 1 is a representative flight map of Mach number vs. altitude for an aircraft with an augmented gas turbine engine. Contour lines are provided showing representative $P_{RAM}/P_8$ pressure ratios for the engine at maximum power.

Using the example provided in the Background section of an engine subject to the flight map of FIG. 1 with a critical ejector pressure ratio $P_{RAM}/P_8$ of 0.22, in order to provide that the ejector would operate with the engine at maximum power and the aircraft operating to the left of contour line 0.22, it would be necessary to boost the ram pressure above 0.22 for proper ejector operation. This can be accomplished in the embodiment of FIGS. 2 and 3 by providing a portion of the fan air 50 to the boost pump 56 to mix with and boost the lower Mach number ram air pressure sufficient to raise the pressure ratio at the ejector above the critical ejector pressure ratio. In the embodiment depicted in FIG. 3, valve 76 could be opened or closed as needed to controllably inject sufficient fan air into the boost pump to raise the ram air pressure to a sufficient boosted ram air pressure for proper ejector operation at lower Mach numbers, while it could be closed and conserve fan airflow when the engine is operating at the higher Mach numbers, i.e., to the left of contour line 0.22, when the unboosted ram pressure would be sufficient for ejector operation.

FIGS. 4 and 5 schematically represent alternative embodiments of the boost pump of the present invention. In the alternative embodiment of FIG. 4, the means for controlling the ratio of fan airflow to ram airflow includes mechanically changing the ratio of fan airflow area $A_f$ to ram airflow area $A_r'$. This can be accomplished by providing flow mixer 70' with a mixing section 72' having a means for mechanically changing the ram airflow area, $A_r'$, such as depicted in this embodiment by an actuator 82 moving the walls of the mixing section 70' to reduce and enlarge both the ram airflow area $A_r'$ and the cross-sectional flow mixing area $A_m'$. In this particular embodiment, the diffuser section 74' also varies with the change in area of the mixing section. Alternatively, the fan airflow area to the ram airflow area could be controlled by changing the area of the fan airflow ejector outlet 65', such as with multiple independently controlled fan airflow injectors 63 in a single mixer.

In another alternate embodiment, shown in FIG. 5, the boost pump 56" comprises multiple flow mixers in parallel. In this particular embodiment, there are three flow mixers 86, 88 and 90 for providing different area ratios of fan airflow area to ram airflow area. In this particular embodiment, flow mixers 86 and 88 have fan airflow areas 97 and 98, respectively, that are substantially the same and different from fan airflow area 99 of flow mixer 90 while the ram airflow area of flow mixer 86 is different from the ram airflow areas of flow mixers 88 and 90. Each of the flow mixers includes a backflow valve 92 which operates to prevent backflow through the boost pump when the corresponding fan airflow valve is closed and the ram airflow is not boosted relative to the boosted ram airflow of the other flow mixers in parallel. In operation, when the ram air is of sufficient pressure to flow through the boost pump with the fan airflow valves all closed, each of the corresponding backflow valves will be open permitting flow in the ejecting direction whereas if the pressure ratio is below the critical ejector pressure ratio, the backflow valves will operate to prevent backflow to the source of ram air. The multiple flow mixers in parallel permits on/off valves in the fan airflow lines to be used to obtain a number of different boosted ram air pressures by one of ordinary skill in the art determining a matrix and a schedule that can achieve the desired boosted ram air pressures. Using simple on/off valves, the number of boost levels available is $2^n$, where n is the number of parallel flow mixers. The particular embodiment of FIG. 5, with three parallel flow mixers, thus provides eight levels of boost. In this embodiment, the fan airflow valves 95 and 96 to flow mixers 88 and 90 are open while the fan airflow valve 94 to flow mixer 86 is closed. Thus, the boosted ram air is flowing in the ejecting direction through flow mixers 88 and 90 and the backflow valve 92 in flow mixer 86 prevents loss of pressure through flow mixer 86 in the upstream direction.

In all the embodiments, the boost pump operates to provide a boosted ram air pressure which will allow ejector operation through all areas of the flight map with a minimum use of fan airflow by providing means for controlling the amount of fan airflow necessary for proper ejector operation. Controllably injecting the fan airflow into the ram airflow provides a simple, cost-effective way of providing ejector air for cooling of a divergent section of a nozzle and/or for sound suppression.

While the present invention has been described with reference to the preferred embodiment, and alternate embodiments thereof, numerous variations may be made by those skilled in the art without departing from the essential spirit and scope of the invention. For example, the ram air source could be supplied from a bay flow area with the boost pump boosting flow through the aircraft engine bay, thus providing the additional advantage of not only providing a bay flow but providing a source of ejection air for sound suppression and/or exhaust nozzle cooling. Other variations will occur to those skilled in the art which do not depart from the inventive concepts described herein.

We claim:

1. In a gas turbine engine including, in serial flow relationship, an engine inlet, a fan, a core engine defining a core flow path for core airflow, and an ejecting exhaust nozzle for obtaining thrust from said core airflow, said ejecting exhaust nozzle comprising:

a convergent section;

a divergent section extending downstream from said convergent section;
an ejector; and
a boost pump comprising:
    a flow mixer including a boost plane and a mixing section extending downstream from said boost plane;
    said boost plane comprising a ram airflow area for receiving a ram airflow having a ram airflow temperature, velocity, and pressure, and a fan airflow area for receiving a fan airflow having a fan air temperature, velocity, and pressure, wherein during ejector operation the direction of said ram airflow and the direction of said fan airflow at said boost plane are substantially parallel to each other; and
    a fan airflow injector having an outlet comprising said fan airflow area;
    wherein during boost pump operation said fan airflow is injected into said ram airflow at said boost plane and mixes with said ram airflow over a length of said flow mixer, achieving a substantially uniform boosted ram airflow having a substantially uniform boosted ram air temperature, velocity and pressure, said boost pump supplying said boosted ram airflow to said ejector and said ejector ejecting said boosted ram airflow into said divergent section core airflow.

2. An ejecting exhaust nozzle as claimed in claim 1 wherein said boost pump further comprises a diffuser extending downstream from said flow mixer.

3. An ejecting nozzle as claimed in claim 1 wherein said ram airflow is supplied to said boost plane from a bypass duct extending to the engine inlet.

4. An ejecting nozzle as claimed in claim 1 wherein said ram airflow is supplied from a ram air inlet proximate said engine exhaust nozzle.

5. An ejecting nozzle as claimed in claim 1 wherein said mixing section has a substantially constant cross-sectional area.

6. An ejecting exhaust nozzle as claimed in claim 1 further comprising means for controlling the ratio of said fan airflow to said ram airflow.

7. An ejecting nozzle as claimed in claim 6 wherein said control means comprises means for mechanically changing the ram flow area.

8. An ejecting nozzle as claimed in claim 6 wherein said controlling means comprises a valve for controlling said fan airflow.

9. An ejecting nozzle as claimed in claim 6 wherein said gas turbine engine is operable through a flight map comprising a predetermined range of Mach numbers and altitudes, and said means for controlling the ratio of said fan airflow to said fan airflow controls said boosted ram airflow such that said ejector is operable throughout said flight map to eject said boosted ram air into said divergent section core airflow.

10. An ejecting nozzle as claimed in claim 6 wherein said controlling means comprises multiple flow mixers in parallel.

11. An ejecting nozzle as claimed in claim 10 wherein said multiple flow mixers comprise more than one area ratio between said ram flow area and said fan flow area.

12. An ejecting nozzle as claimed in claim 10 wherein said control means further comprises valves controlling said fan airflow to said flow mixers.

13. An ejecting nozzle as claimed in claim 12 further comprising backflow valves in said flow mixers to prevent backflow through a flow mixer when the corresponding said fan airflow valve is closed.

14. In a gas turbine engine including, in serial flow relationship, an engine inlet, a core engine, including a compressor, defining a core flow path for core airflow, and an ejecting exhaust nozzle for obtaining thrust from said core airflow, said ejecting exhaust nozzle comprising:
    a convergent section;
    a divergent section extending downstream from said convergent section;
    an ejector; and
    a boost pump comprising:
        a flow mixer including a boost plane and a mixing section extending downstream from said boost plane;
        said boost plane comprising a ram airflow area for receiving a ram airflow having a ram airflow temperature, velocity, and pressure, and a compressor airflow area for receiving a compressor airflow having a compressor air temperature, velocity, and pressure, wherein during ejector operation the direction of said ram airflow and the direction of said compressor airflow at said boost plane are substantially parallel to each other; and
        a compressor airflow injector having an outlet comprising said compressor airflow area;
        wherein during boost pump operation said compressor airflow is injected into said ram airflow at said boost plane and mixes with said ram airflow over a length of said flow mixer, achieving a substantially uniform boosted ram airflow having a substantially uniform boosted ram air temperature, velocity and pressure, said boost pump supplying said boosted ram airflow to said ejector and said ejector ejecting said boosted ram airflow into said divergent section core airflow.

15. An ejecting exhaust nozzle as claimed in claim 14 further comprising means for controlling the ratio of said compressor airflow to said ram airflow.

16. An ejecting nozzle as claimed in claim 15 wherein said control means comprises a valve controlling said compressor airflow to said flow mixer.

17. In a gas turbine engine including, in serial flow relationship, an engine inlet, a core engine defining a core flow path for core airflow, and an ejecting exhaust nozzle including a convergent section and a divergent section for obtaining thrust from said core airflow, a method of ejecting air into the divergent section core airflow comprising:
    controllably injecting a higher pressure, higher velocity first airflow into a lower pressure, lower velocity and substantially parallel ram airflow, entraining said ram airflow to achieve a boosted ram airflow having a pressure higher than said ram airflow and lower than said first airflow; and
    supplying said boosted ram airflow to a divergent section ejector such that a higher velocity, higher pressure core gas flow withdraws said boosted ram airflow into the core airflow.

18. A method of ejecting air into the divergent section core airflow as claimed in claim 17 further comprising diffusing said boosted ram airflow to raise the pressure of said boosted ram airflow.

19. A method of ejecting air into the divergent section core airflow as claimed in claim 17 further including generating a pressure ratio above a critical ejector pressure ratio, wherein said pressure ratio is defined by a total pressure of said boosted ram airflow divided by a total pressure of said divergent section core airflow.

20. A method of ejecting air into the divergent section core airflow as claimed in claim 19 wherein said critical ejector pressure ratio is greater than 0.20.

* * * * *